June 19, 1962 A. M. NELSON ET AL 3,039,681

CARD PROCESSING SYSTEM

Filed May 2, 1955 3 Sheets-Sheet 1

ALFRED M. NELSON
HANS M. STERN
INVENTORS

BY
Ellsworth R. Roston
ATTORNEY

ALFRED M. NELSON
HANS M. STERN
INVENTORS

BY
Ellsworth R. Roston
ATTORNEY

ALFRED M. NELSON
HANS M. STERN
INVENTORS

BY
Ellsworth R. Roston
ATTORNEY

United States Patent Office 3,039,681 Patented June 19, 1962

3,039,681
CARD PROCESSING SYSTEM

Alfred M. Nelson, Redondo Beach, and Hans M. Stern, Los Angeles, Calif., assignors to The Magnavox Company, Los Angeles, Calif., a corporation of Delaware Filed May 2, 1955, Ser. No. 505,248
12 Claims. (Cl. 235—61.11)

This invention relates to apparatus for processing stored information and more particularly to apparatus for making stored information available on a recirculating basis so that information can be selected for use in data processing systems.

The use of digital information has become increasingly important in recent years. Such information is used in computers to solve complex mathematical problems. It is also being used in data processing systems for such purposes as controlling the inventory of large department stores and for handling the complex operations of a bank. In such data processing systems, information relating to a great variety of different items must be readily available at any time. For example, in a department store information relating to all of the items carried by the store including different models of equipment and different sizes of clothing must be readily available. This may require millions of different bits of information.

Since as many as millions of bits of different information may be required in a data processing system, problems have arisen as to how to handle the different bits of information and make them available in a short time. One common method has been to store the bits of information on a plurality of cards and to stack the cards so that the cards can be sequentially presented for use. However, it has been difficult to peel the cards off one at a time and move the cards individually past the stations for reading the information in the cards. Other difficulties have been presented in restacking the cards after the cards have been sequentially moved past the reading station.

Still other problems in the equipment now in use have resulted from the ncessity of moving the cards manually to the start position if it should be desired to use the cards again after they have previously been processed. This necessity for manual movement has considerably reduced the average speed at which the data can be processed. This problem has been especially troublesome when it has been required to process the same cards a number of times and to read only selected information in each cycle of processing.

This invention provides a system for sequentially moving a plurality of stacked cards past a reading station on an individual basis and in their order of stacking. The system includes a plurality of drums for recirculating the cards in a minimum amount of space and for stacking the cards in their original relationship so that the cards can be automatically recirculated any desired number of times. Each of the drums is evacuated as by a pump to exert a suction force on the cards as the drums rotate. Gates are also provided between successive pairs of drums to obtain a transfer of the cards from one drum to the next. In this way, the drums pick up the cards at one end of the stack and deposit the cards at the other end of the stack such that the cards can be automatically recirculated past one or several reading or recording stations. By using a plurality of drums ad associated equipment to recirculate the cards, the apparatus constituting this invention ca be made compactly and inexpensively to obtain a reliable operation.

An object of this invention is to provide apparatus for use in a data processing system to make the information stored in a plurality of stacked cards available on an individual basis and in the order of stacking.

Another object is to provide apparatus of the above character for individually selecting a plurality of stacked cards in the order of stacking and for depositing the cards in the stack in the same order after the cards have been processed for the selection of information from the cards.

A further object is to provide apparatus which can be built at a low cost and in a compact space to obtain a cyclic processing of a large amount of stored information.

Still another object is to provide apparatus for insuring the cyclic circulation of stacked cards in the proper order by including a plurality of rotating drums and imposing suction forces on the drum peripheries to press the cards against the peripheries as the drums rotate.

A still further object is to provide apparatus for reading and recording magnetic information at selected positions on a plurality of stacked cards so that the information can be properly used in a data processing system.

Other objects and advantages will be apparent from a detailed description of the invention and from the appended drawings and claims.

Figure 1:
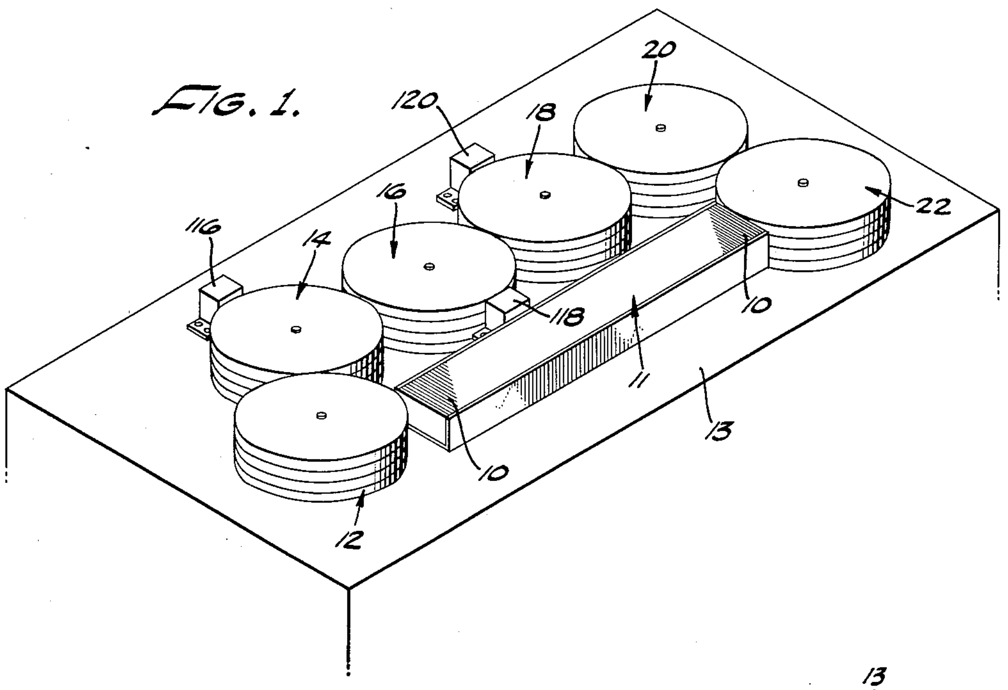
FIGURE 1 is a perspective view of apparatus constituting one embodiment of this invention as seen from a position above, to the left of and in front of the apparatus.
Figure 2:
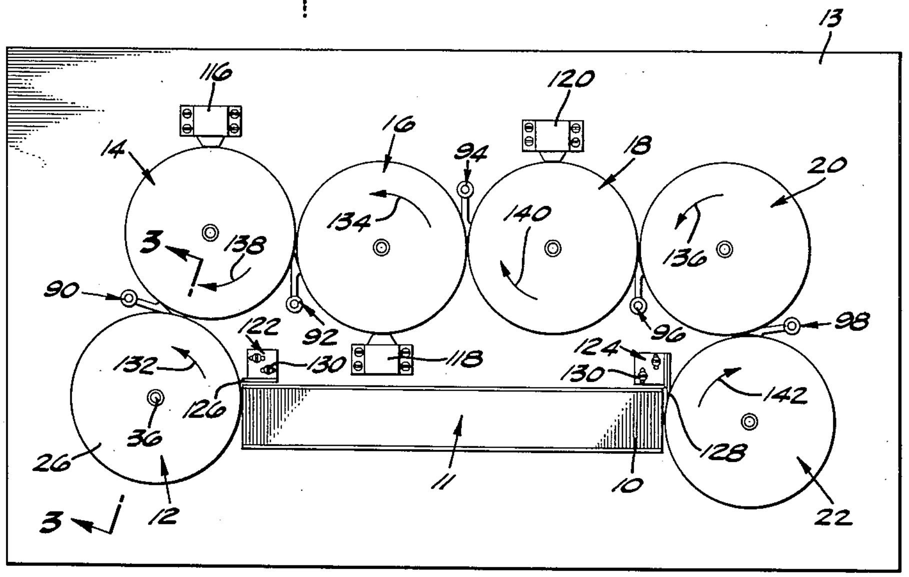
FIGURE 2 is a top plan view of the apparatus shown in FIGURE 1 and shows certain features in further detail.

In the embodiment of the invention shown in FIGURES 1 to 5, inclusive, a plurality of cards 10 are arranged in stacked relationship such as in a stack 11. The bottom edge of each card is adapted to rest on a flat surface such as the top of a table 13 (FIGURES 1 and 2). The faces of each card are disposed in a substantially vertical plane and in contiguous relationship to the faces of the adjacent cards.

Each card is provided with a plurality of bits of information, preferably in magnetic form. When each bit of information is on a binary basis, one polarity of magnetization may represent an indication of "0" and an opposite polarity of magnetization may represent an indication of "1." The different bit of information on each card may be disposed in successive positions along the card in the lateral direction. As will be described in detail hereafter, this represents the direction in which the card is moved by apparatus forming a part of this invention.

Only one face of the card may be magnetically polarized in the lateral direction to represent different bits of binary information or both faces may be magnetically polarized in this manner. By polarizing both faces of each card, the number of cards required to store a particular amount of information may be substantially halved.

A plurality of drums 12, 14, 16, 18, 20 and 22 are disposed relative to one another and to the stacked cards such that the cards can be moved individually from one end of the stack along successive drums and deposited at the other end of the stack. For this purpose, the drum 12 is disposed to frictionally engage the cards at one end of the stack 11 such as the left end shown in FIGURES 1 and 2.

The drum 12 includes a pair of exterior plates 26 (FIGURE 3) defining a housing and having inwardly disposed lip portions 28 at their peripheries. A second pair of plates 30 are disposed within the compartment defined by the plates 26 and are suitably disposed in spaced relationship to the plates 26 as by spacers 32 mounted on studs 34. The studs 34 extend through the plates 26 and 30 at positions near the peripheries of the plates to maintain the plates in fixed position relative to one another. A plug 36 also extends into a threaded socket in the upper plate 26 at the annular center of the plate.

The radius of the plates 30 is slightly less than that of the plates 26 by a distance corresponding substantially to the thickness of the cards 10 so as to form a neck portion 38 relative to the periphery of the plates 26. Each of the plates 30 has annular flange portions 40 extending axially from both faces of the plate 30 at the periphery of the plate. The flange portions 40 are so formed as to produce slots 42 between the plates 30 and between the flanges on the plates 30 and the lip portions 28 on the plates 26. The slots 42 communicate with suction passageways 46 formed between adjacent plates by the inclusion of the spacers 32.

The drum 12 is disposed against an annular collar 52 provided at one end of a hollow shaft 54. Bearings 56 are provided at opposite ends of the shaft 54. The inner races of the bearings 56 are mounted on the shaft and the outer races of the bearings are disposed against a bushing 58 secured to a housing 60 as by studs 62. Seals 64 are disposed at opposite ends of the bearings to prevent the leakage of lubricating fluid from the bearings.

A hole 66 is provided in the housing 60 at a position between the bearings 56. The hole 66 is provided so that a belt 68 can extend into the housing and around a pulley 70. The pulley 70 is suitably positioned within the housing 60 as by a sleeve 72 mounted on the shaft 54 between the bearings 56. In this way, the shaft 54 can be rotated by a suitable motor (not shown).

The bearings 56 and the sleeve 72 are maintained in fixed position on the shaft 54 as by a lock washer 74 and a nut 76. The nut 76 is adapted to be screwed on a threaded portion at the bottom of the shaft 54. A sealing disk 78 is also adapted to be screwed on the threaded portion of the shaft 54. The sealing disk 78 operates in conjunction with a bottom plate 80 to prevent movement of air between the interior of the housing 60 and the interior of the hollow shaft 54 upon a difference in pressure between the housing and the shaft.

The plate 80 is secured to the housing 60 as by studs 82. A hollow conduit 84 is in turn disposed as by a push fit within the plate 80. In this way, air can be exhausted from the hollow interiors of the shaft 54 and the conduit 84 as by a vacuum pump 86. Although the pump 86 is shown in block form in FIGURE 3, it should be appreciated that any suitable type of pump can be used.

Figure 3:
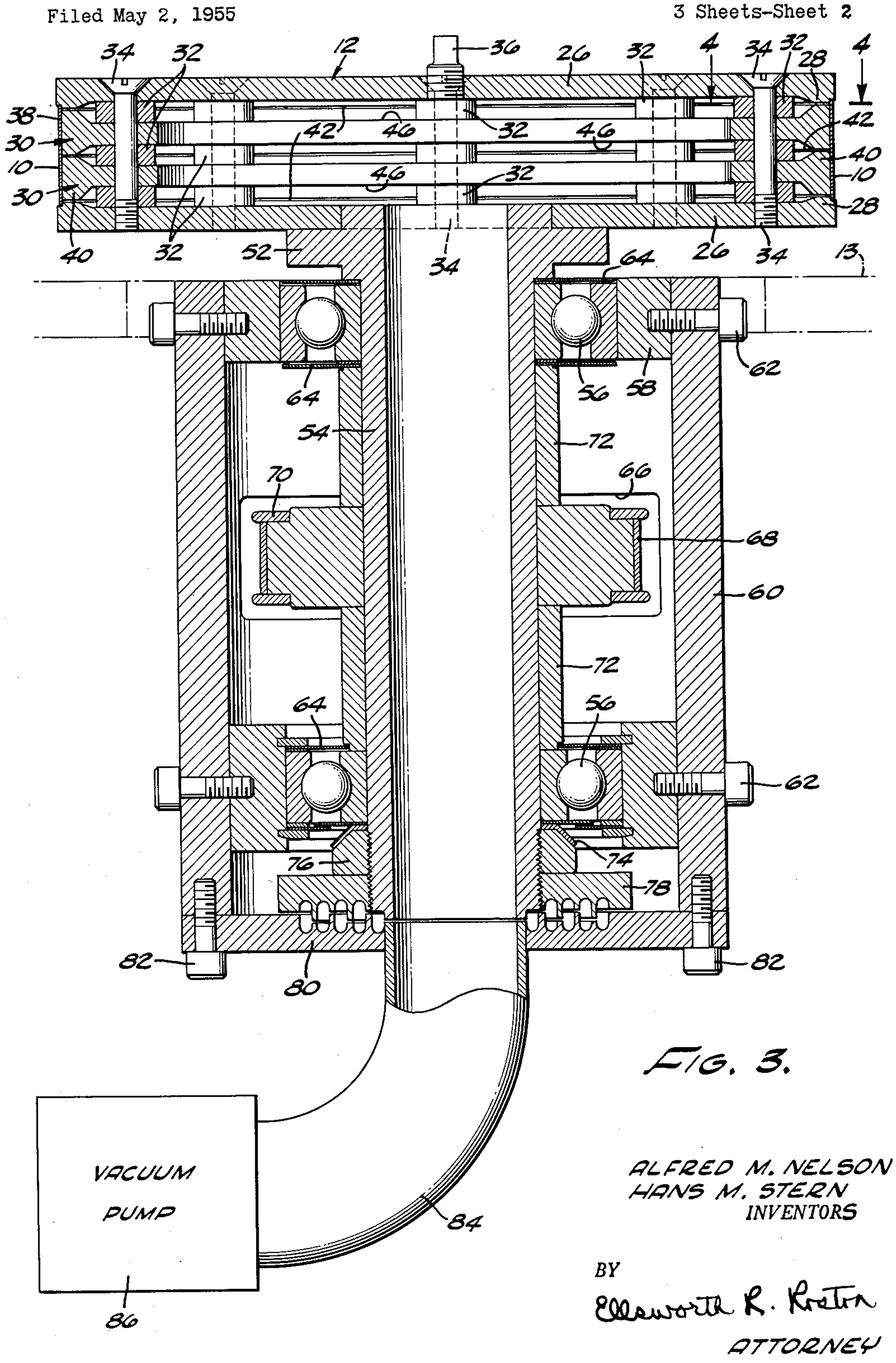
FIGURE 3 is an enlarged sectional view substantially on the line 3—3 of FIGURE 2 and illustrates in further detail the construction of one of the drums forming a part of the embodiment shown in FIGURES 1 and 2.

The drums 14, 16, 18, 20 and 22 are constructed in a manner similar to that shown in FIGURE 3 and described above for the drum 12. The drum 14 is disposed in contiguous relationship to the drum 12 at one position and to the drum 16 at another position. Gates 90 and 92 are respectively disposed between the drums 12 and 14 and between the drums 14 and 16 at the positions in which the drums are contiguous to each other. The construction and operation of the gates 90 and 92 will be described in detail subsequently.

Similarly, the drum 18 is disposed in contiguous relationship to the drum 16 at one position and to the drum 20 at another position. Gates 94 and 96 are disposed between the drums 16 and 18 and between the drums 18 and 20 at the positions in which the pairs of drums are contiguous to each other. The gates 94 and 96 correspond in construction and operation to the gate 90. The drum 22 is contiguous to the drum 20 at one position and a gate 98 corresponding in construction and operation to the gate 90 is disposed between the drums at this position. At another position, the drum 22 is disposed in frictional relationship to the stack of cards 10 at one end of the stack such as the right end as shown in FIGURES 1 and 2. As will be described in detail subsequently, this frictional relationship causes the cards to be deposited by the drum 22 at the right end of the stack.

Figure 5:
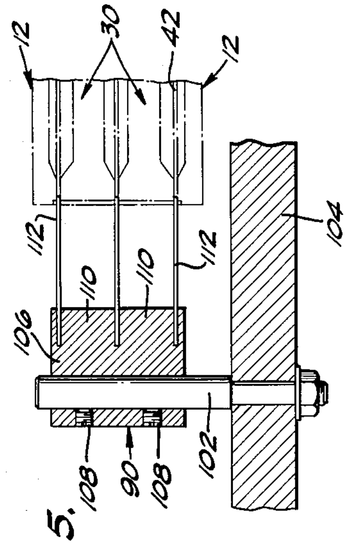
FIGURE 5 is an enlarged, fragmentary sectional view substantially on the line 5—5 of FIGURE 4 and illustrates in further detail the construction of the gate shown in FIGURE 4 and the disposition of the gate relative to an associated drum.
Figure 4:
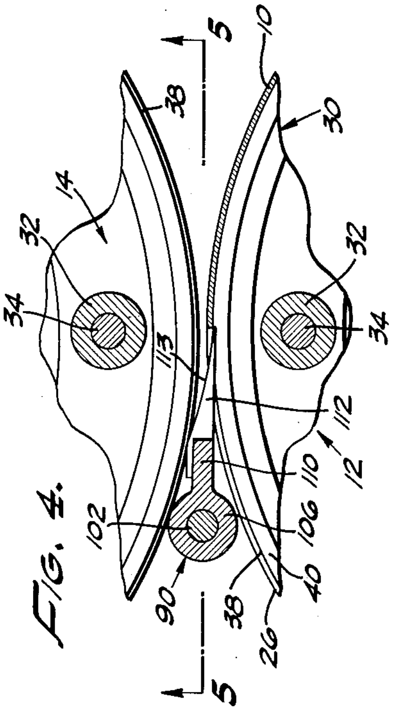
FIGURE 4 is an enlarged, fragmentary sectional view substantially on the line 4—4 of FIGURE 3 and shows in further detail the construction and disposition of a pair of adjacent drums and of a gate providing a coupling between the drums.

The construction of the gate 90 is shown in detail in FIGURES 4 and 5. The gate 90 includes a post 102 supported as by a nut on a bar 104. A sleeve 106 is in turn fixedly positioned on the post 102 as by nuts 108 which screw into the sleeve to press against the post. The sleeve 106 has a rib portion 110 which supports fingers 112. Each finger 112 tapers inwardly as at 113 as it extends from the flange portion 110 of the sleeve 106. In this way, the fingers 112 are disposed in contiguous relationship to the periphery of the drum 14 at a position laterally near the rib portion 110 of the sleeve 106. At its outer extremity, the fingers 112 are able to extend into the slots 42 in the drum 12 at a position radially interior to the disposition of the cards 10 on the drum.

As shown in FIGURES 1 and 2, a plurality of transducing members are disposed in contiguous relationship to certain of the drums. By way of example, transducing members 116, 118 and 120 are respectively disposed in contiguous relationship to the drums 14, 16 and 18. Each of the transducing members 116, 118 and 120 is provided with a magnetic member such as a coil so disposed as to be magnetically coupled to the cards 10 during their movement past the transducing members.

Each of the transducing members 116, 118 and 120 may provide either a reading action or a recording action, the particular action being dependent upon the logical networks (not shown) associated with the transducing members. This results from the fact that transducing members for reading or writing may be constructed in a similar manner. By way of illustration, the members 116 and 118 may be adapted to read the information on the cards by converting the magnetic information on the cards 10 into corresponding electrical signals in the coils of the transducing members. The magnetic member 120 may be adapted to provide a recording action by converting electrical signals in the coils into corresponding magnetic information on the cards 10.

A pair of stops 122 and 124 (FIGURE 2) are disposed on the table 13 at opposite ends of the stack 11. The stops 122 and 124 are provided with fingers 126 and 128 which extend towards the peripheries of the drums 12 and 22, respectively. The fingers 126 and 128 can be adjustably positioned relative to the drums 12 and 22 by providing elongated slots in the stops 122 and 124. Studs 130 extend through the slots into the table 13 for fastening the stops 122 and 124 to the table.

Since the drum 12 is coupled to the shaft 54, it rotates with the shaft when the shaft is driven by the belt 68 (FIGURE 3). The housing 60 remains stationary as the shaft 54 rotates because of the operation of the bearings 56, and the conduit 84 also remains stationary since it is push fit into the plate 80 defining the bottom of the housing. Even though the shaft 54 is rotating relative to the conduit 84, the vacuum pump 86 is able to withdraw air through the continuous passageway formed by the shaft and the conduit. This results from the operation of the disk 78 and the plate 80 in producing a seal at the juncture between the shaft 54 and the conduit 84. The vacuum created by the pump 86 causes air to be withdrawn from the drum 12 through the passageway 46 and the hollow interiors of the shaft 54 and the conduit 84. Since the slots 42 communicate with the passageways 46, an inward pressure is created at the periphery of the drum 12 upon the operation of the vacuum pump 86.

The drums 12, 16 and 20 are adapted to be driven in counterclockwise directions as indicated by arrows 132, 134 and 136 in FIGURE 2. The drums 14, 18 and 22 are adapted to be driven in clockwise directions as indicated by arrows 138, 140 and 142 in FIGURE 2. In this way, each drum rotates in an opposite direction to its adjacent drums. When the drum 12 rotates in a clockwise direction, it presses against the card 10 at the left end of the stack and moves the card with it towards the rear of the table 13. The drum 12 can be made to remove only one of the cards 10 from the stack at any one time by adjusting the spacing between the finger 126 and the periphery of the drum. Each card 10 removed by the drum 12 is positioned on the periphery of the drum at the neck portion 38. This helps to hold each card in fixed position on the periphery of the drum 12 as the drum rotates.

After each card 10 has been removed by the drum 12 from the stack, it rotates through a particular distance before reaching the gate 90. As the front end of the card reaches the fingers 112 (FIGURES 4 and 5) on the gate 90, the fingers remove the card from the periphery of the drum. This results from the disposition of the fingers 112 within the slots 42 so as to block the movement of the cards 10 on the periphery of the drum 12 past the fingers. The fingers 112 are tapered as at 113 such that they guide the cards 10 from the periphery of the drum 12 to the periphery of the drum 14. This may be best seen in FIGURE 4. When each card 10 reaches the periphery of the drum 14, it becomes fixedly positioned on the drum because of the suction action produced on the drum by the vacuum pump 86 or apparatus similar to the pump 86.

Upon the transfer of each card to the drum 14, the card rotates with the drum until it reaches the gate 92 (FIGURE 2). The gate 92 then acts in a manner similar to the gate 90 to transfer the card from the drum 14 to the drum 16. The card then remains fixedly positioned on the drum 16 because of the pressure imposed on the card and travels on the periphery of the drum until it reaches the gate 94. The gate 94 then transfers the card to the drum 18.

In like manner, each card rotates on the periphery of the drum 18 for a particular distance and then is transferred to the drum 20 by the gate 96. The gate 98 subsequently produces a transfer of the card from the drum 20 to the drum 22 after the card has rotated through a particular angular distance on the drum 20. When the card becomes transferred to the drum 22, it remains fixedly positioned on the drum until it reaches the stop 124. At this position, the finger 128 acts upon the card to remove the card from the drum. In this way, the card becomes positioned at the right end of the stack 11. Since the cards 10 travel individually on the drums and in sequence corresponding to their positioning in the stack 11, the cards become positioned at the right end of the stack 11 in the same sequence as their removal from the left end.

It has been previously described that bits of magnitic information are provided on each of the cards 10. Each bit of magnetic information occupies only a relatively small amount of space on the card so that a large number such as hundreds of bits of information can be easily stored on a single card. These bits of information become coupled in sequence to the read coil in the transducer 116 such that electrical signals are induced in the coil in a pattern corresponding to the magnetic information on the cards. At selected intervals, the signals induced in the read coil of the transducer 116 may be passed for use by a data processing system or a computer. The particular times for the passage of the electrical signals are dependent in a well-known manner upon the operation of the computer or data processing system.

As has been previously described, magnetic information may be provided on both sides of each card. In this way, a minimum number of cards can be used to store a desired amount of information. The read coil of the transducer 116 is adapted to produce electrical signals in accordance with the magnetic information on one side of the card. Similarly, the read coil of the transducer 118 is adapted to read the magnetic information on the other side of each card. This results from the fact that one face of each card rests against the drum 14 and the other face of each card rests against the drum 16 when the card is transferred from the drum 14 to the drum 16.

Information can be recorded on the cards as well as read from the cards. This is desirable because the information obtained at one position on the cards may affect the information which should be recorded at other positions. Furthermore, at different times it may be desired to record new information as the data stored in the cards varies. For example, new information may be recorded at particular positions on the cards for a data processing system used in a department store as articles are sold by the store. Recordation of new information is obtained by transducer 120 (FIGURES 1 and 2), which may be constructed in a manner similar to the transducers 116 and 118. Although only one recording transducer is shown, it should be realized that others may also be included especially when magnetic information is recorded on both sides of each card.

The apparatus described above has several important advantages. By disposing a plurality of cards in a stack 11, the apparatus is able to provide a relatively great amount of information in a relatively small space. For example, several thousand cards can be stacked in a space of only a few inches. The amount of information stored in the confined space is considerably increased by providing a plurality of bits of information on each card. This is especially true when the information is in magnetic form. For example, hundreds of bits of magnetic information can be stored on a card along a lateral length of only a few inches.

The apparatus is also advantageous for other reasons. It removes cards individually and in proper order from the stack. This results from the disposition of the drum 12 relative to the stack 11 and from the inclusion of the stop 122. The apparatus also retains the cards in fixed position on the peripheries of the drums such as the drum 12 because of the pressure imposed on the peripheries of the drums.

Since the cards 10 are deposited in proper order on the right end of the stack, they can be recirculated indefinitely for the extraction or recordation of information by transducers such as the transducers 116, 118 and 120. This is especially important in such equipment as data processing systems where only selective information may be desired in each cycle of computation.

The apparatus constituting this invention obtains a recirculation of the cards 10 in a relatively small amount of space. This is accomplished by including a plurality of drums and disposing the drums in contiguous relationship to one another. The recirculation of the cards 10 is obtained successfully by the operation of the gates such as the gate 90 in transferring the cards from one drum to the next without any loss of cards.

Cards especially cannot be lost during the process of recirculation since at least a portion of each card is forced by pressure differential against the periphery of a drum during its movement past the associated gate. For example, the trailing portion of each card 10 is pressed against the drum 12 at the beginning of its movement along the gate 90. Subsequently, the end portions of each card are disposed on the drums 12 and 14 while the middle portion is moving along the gate 90. In the final stages of transfer from the drum 12 to the drum 14, the leading portion of each card 10 is pressed against the periphery of the drum 14.

Figure 6:
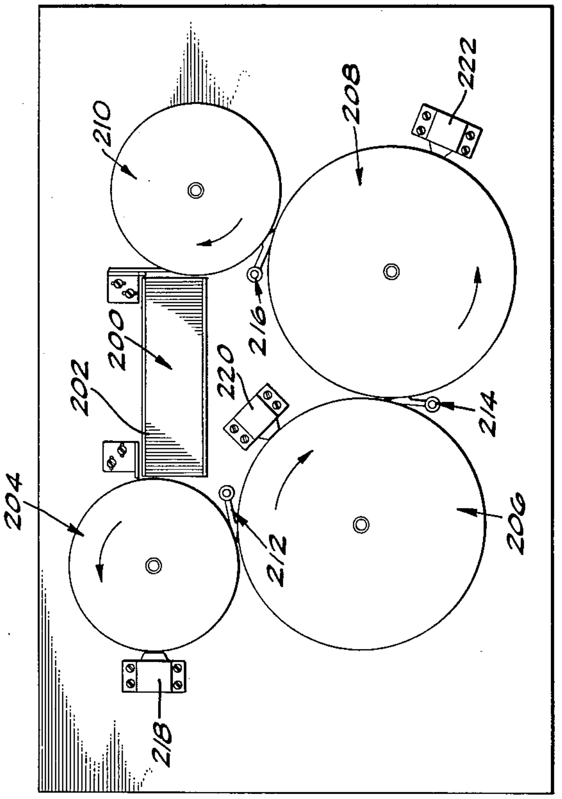
FIGURE 6 is a top plan view similar to FIGURE 2 and illustrates another embodiment of the invention.

Sometimes the stack of cards may not have to be as great as that shown in FIGURES 1 and 2. For a stack formed from a relatively restricted number of cards only a relatively few number of drums are required to obtain a recirculation of the cards. For example, a system such as that shown in FIGURE 6 may be used. The system shown in FIGURE 6 includes a stack 200 formed from a number of cards 202. A drum 204 is disposed at one end of the stack 200 in a manner similar to the disposition of the drum 12 in FIGURES 1 and 2. The drum 204 may have a radius corresponding substantially to that of the drum 12 in FIGURES 1 and 2.

A drum 206 is disposed in contiguous relationship to the drum 204 at one position and to a drum 208 at another position. The drums 206 and 208 may have substantially equal radii and radii somewhat greater than that of the drum 202. A drum 210 is in turn contiguous to the drum 208 at one position and to the other end of the stack 200 at a second position. The drum 210 may be disposed in the same position relative to the stack 200 as the disposition of the drum 22 relative to the stack 11 in FIGURES 1 and 2. The drum 210 may have a radius similar to that of the drum 22.

Gates 212, 214 and 216 are respectively disposed between the drums 204 and 206, the drums 206 and 208 and the drums 208 and 210. The gates 212, 214 and 216 may be constructed in a manner similar to that discussed above for the gate 90 in the previous embodiment. The gates extend into the position where their associated pairs of drums are contiguous to one another so that the cards may be transferred from one drum to the next.

Transducers 218, 220 and 222 are positioned in contiguous relationship to the drums 204, 206 and 208, respectively. The transducers 218, 220 and 222 are constructed in a manner similar to the transducers 116, 118 and 120 in FIGURES 1 and 2. The transducers 218, 220 and 222 respectively perform functions similar to those described above for the transducers 116, 118 and 120.

The drum 204 removes cards individually from the left end of the stack 200 as it rotates in a counterclockwise direction. These cards become transferred in sequence to the drum 206 by the operation of the gate 212. The cards subsequently become transferred to the drum 208 and then to the drum 210. After receiving the cards from the drum 208, the drum 210 rotates through a particular angular distance and deposits the cards at the right end of the stack 200 in the same order as their removal from the left end of the stack. In this way, a recirculation of the cards is obtained by the operation of only four drums.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination for processing a plurality of cards each having a plurality of bits of signal information, a stack for holding the cards, means including a first drum for withdrawing the cards individually and in sequence from one end of the stack, means including a plurality of drums for obtaining a controlled movement of the withdrawn cards around the drums and for depositing the cards in sequence on the other end of the stack, and transducer means coupled to the drums for providing a change in form between signal information at selected positions on the cards and the production of signals in the transducing means at these positions.

2. In combination for processing a plurality of stacked cards each having a plurality of bits of magnetic information, a stack open at opposite ends for the transfer of cards into and out of the stack, means for withdrawing the cards in sequence from one open end of the stack, means including a plurality of drums for recirculating the cards upon their withdrawal from the stack and for depositing the cards at the opposite open end of the stack, and means disposed in contiguous relationship to at least one of the drums for producing a conversion between magnetic information at selected positions on the cards and the production of electrical signals at these selected positions.

3. In combination for processing a plurality of cards each provided with a plurality of bits of signal information, a stack for holding the cards, a plurality of rotatable drums each constructed to produce a vacuum at its periphery, the drums being disposed in intercoupled and adjacent relationship to produce a transfer from the periphery of one drum to the periphery of the adjacent drum at substantially a common tangential position, the drums being constructed to obtain a transfer of the cards from the stack at one end of the stack and to obtain a transfer of cards into the stack at the other end of the stack, means including a plurality of gates disposed in contiguous relationship to pairs of drums at the transfer position to facilitate the transfer of the cards from the periphery of one drum in the pair to the periphery of the other drum in the other pair, means including the drums in the plurality and including the gates in the plurality for providing an individual and sequential removal of the cards in the stack from one end of the stack and for obtaining a transfer of cards into the stack at the other end of the stack, and transducer means disposed in contiguous relationship to at least a particular one of the drums in the plurality for producing a conversion between card information at selected positions and the production of signals in a different form at the transducer means.

4. In combination for processing a plurality of cards each provided with a plurality of bits of signal information, a stack open at opposite ends for holding the cards, a first drum disposed in contiguous relationship to the cards at one open end of the stack to withdraw successive cards individually from the end of the stack, a second drum disposed in contiguous relationship to the cards at the other open end of the stack to add successive cards individually to that end of the stack, a plurality of drums disposed between the first and second drums for carrying the cards from the first drum along successive drums in the plurality to the second drum, means including vacuum means for holding the cards on the peripheries of the drums during their movements along the drum, and means for providing a transducing action between signal information recorded at selected positions on the cards and electrical signals in the transducing means at these selected positions.

5. In combination for processing a plurality of cards each provided with a plurality of bits of signal information, a stack open at opposite ends for holding the cards, a plurality of rotatable drums, means for imposing a pressure on the periphery of each drum to maintain cards in fixed position on the periphery of the drum, means including a first drum in the plurality for withdrawing the cards sequentially and on an individual basis from one open end of the stack, means including second drums in the plurality and gates associated with the drums for effectuating a transfer of the cards from the first drum to successive ones of the second drums, means including a third drum in the plurality and a gate coupling the third drum to the last one of the second drums for restoring the cards to the second open end of the stack for use of the cards on a recirculating basis, and means for providing a transducing action between the signal information on the cards and the production of electrical signals at particular times during the movement of the cards along the drums.

6. In combination for processing a plurailty of stacked cards each having a plurality of bits of signal information disposed for sequential presentation, an input stack open at opposite ends for holding the cards, means including a first drum rotatably disposed for withdrawing the cards individually from one open end of the stack and for retaining the cards in fixed position on the drum during the drum rotation, means including at least a first gate and a second drum rotatably disposed for obtaining an individual transfer of the cards from the first drum and for retaining the cards in fixed position on the drum during the drum rotation, means including a second gate and a third drum rotatably disposed for obtaining an individual transfer of the cards from the second drum and for depositing the cards individually on the other open end of the stack, and means for obtaining at selected positions a transducing action between the occurrence of electrical signals and signal information on the cards.

7. In combination for processing a plurality of stacked cards each having a plurality of bits of signal information, a stack open at opposite ends for holding the cards, a plurality of drums, means including at least a first drum in the plurality for withdrawing the cards in sequence from one open end of the stack, means for applying pressures on the peripheries of the drums to fixedly position the cards on the drums, means for interrupting the pressures exerted by the drums on the cards to obtain a transfer of the cards from each drum to the next drum in the plurality, means including at least a second drum in the plurality for depositing the cards at the opposite open end of the stack, and transducer means associated with the cards for providing a change in form between the signal information at selected positions on the cards and the production of signals in the transducing means at these positions.

8. In combination for processing a plurality of cards each having a plurality of bits of signal information, a stack having openings at first and second opposite ends for the transfer of cards into and out of the stack, first transport means for the cards and disposed in coupled relationship to the first end of the stack for obtaining a transfer of cards from the stack to the transport means for transport, second transport means disposed in coupled relationship to the first transport means and to the second end of the stack for obtaining a transfer of cards from the first transport means to the second transport means and a subsequent transfer of cards in sequence into the stack at the second end of the stack, and transducer means coupled to the transport means for providing a change in form between signal information at selected positions on the cards and the production of signals in the transducing means at these positions.

9. The combination as set forth in claim 8 in which the transport means are movable and are constructed to provide a movement of the cards with the transport means.

10. In combination for processing a plurality of cards each provided with a plurality of bits of signal information, a stack for holding the cards and provided with an opening at the end for obtaining a transfer of cards out of the stack and provided with an opening at a second end for obtaining a transfer of cards into the stack, means including a plurality of transport means disposed in coupled relationship to the first end of the stack and in paired relationship to one another and in coupled relationship to the second end of the stack for providing a transfer of the cards out of the stack at one end for transport and a subsequent transfer of the cards into the stack at the second end, means including a plurality of gates disposed in coupled relationship to the different pairs of transport means in the plurality to facilitate the transfer of cards between the transport means for a movement of the cards from the first end of the stack to the second end of the stack, and transducer means disposed in coupled relationship to at least a particular one of the transport means for providing a conversion between signal information at selected positions and the production of signals in a different form at the transducer means.

11. The combination as set forth in claim 10 in which the transport means are movable in closed loops and are constructed to provide a movement of the cards with the transport means.

12. In combination for processing a plurality of cards each provided with a plurality of bits of signal information, a stack open at opposite ends for holding the cards, means including first transport means disposed in coupled relationship to the stack at one of the open ends of the stack for obtaining a transfer of cards sequentially and on an individual basis from that end of the stack to the transport means for transport, means including second transport means and including gate means disposed in coupled relationship to the first and second transport means for obtaining a transfer of the cards from the first transport means to the second transport means, means including third transport means disposed in coupled relationship to the opposite open end of the stack and including gate means disposed in coupled relationship to the second and third transport means for obtaining a transfer of the cards from the second transport means to the third transport means and then into the stack at the opposite open end of the stack, and means disposed in coupled relationship to at least one of the transport means for providing a transducing action between the signal information on the cards and the production of electrical signals at particular times during the transport of the cards.

References Cited in the file of this patent

UNITED STATES PATENTS

| | | |
|---|---|---|
| 2,026,330 | Tauschek | Dec. 31, 1935 |
| 2,063,486 | Carroll | Dec. 8, 1936 |
| 2,184,229 | Spiess | Dec. 19, 1939 |
| 2,359,670 | Page | Oct. 3, 1944 |
| 2,510,552 | Carroll et al. | June 6, 1956 |
| 2,685,409 | English et al. | Aug. 3, 1954 |
| 2,686,052 | Winkler | Aug. 10, 1954 |
| 2,806,695 | Carlisle | Sept. 15, 1957 |